(12) United States Patent
Neuenschwander et al.

(10) Patent No.: US 9,685,264 B2
(45) Date of Patent: *Jun. 20, 2017

(54) DIE ASSEMBLY AND METHOD FOR MANUFACTURING WOUND MOTOR LAMINATED ARTICLE

(71) Applicant: L.H. Carbide Corporation, Fort Wayne, IN (US)

(72) Inventors: Thomas R. Neuenschwander, Fort Wayne, IN (US); Barry A. Lee, Fort Wayne, IN (US)

(73) Assignee: L.H. Carbide Corporation, Fort Wayne, IN (US)

( * ) Notice: Subject to any disclaimer, the term of this patent is extended or adjusted under 35 U.S.C. 154(b) by 340 days.

This patent is subject to a terminal disclaimer.

(21) Appl. No.: 14/057,440

(22) Filed: Oct. 18, 2013

(65) Prior Publication Data

US 2014/0209728 A1 Jul. 31, 2014

Related U.S. Application Data

(60) Provisional application No. 61/715,710, filed on Oct. 18, 2012.

(51) Int. Cl.
*H02K 15/02* (2006.01)
*H01F 3/04* (2006.01)
(Continued)

(52) U.S. Cl.
CPC .............. *H01F 3/04* (2013.01); *H01F 41/022* (2013.01); *H02K 1/165* (2013.01); *H02K 15/02* (2013.01);
(Continued)

(58) Field of Classification Search
CPC ...... H02K 15/026; H02K 15/02; H02K 1/165; H01F 3/04; H01F 41/022
See application file for complete search history.

(56) References Cited

U.S. PATENT DOCUMENTS

| 4,320,645 | A | 3/1982 | Stanley |
| 4,356,377 | A | 10/1982 | Norton |

(Continued)

OTHER PUBLICATIONS

Article: "A New Core, An Innovative Core Structure and Manufacturing Method Boosts Efficiency of Permanent-Magnet Motors", Hiroyuka Akita et al., IEEE Industry Applications Magazine, Nov./Dec. 2005—www.ieee.org/ias.

(Continued)

*Primary Examiner* — Dang Le
(74) *Attorney, Agent, or Firm* — Faegre Baker Daniels LLP (57) ABSTRACT

A stator core is formed from a continuous strip of wound sheet stock material, in which the sheet stock material is converted from the sheet stock to a formed material including winding slot cutouts. This strip of formed material is then wound into the stator core, with the winding slot cutouts in the formed material maintained at a substantially constant width throughout most of the radial extent of the resulting winding slots in the finished article. However, one or more of the radially innermost and radially outermost layers may define winding slot cutouts that are wider than the other winding slot cutouts. Where several radial layers are altered in this way, the cutout widths are progressively expanded such that the resulting winding slot has terminal ends with edges that are effectively "radiused" or rounded, thereby protecting windings near the edge of such slots.

17 Claims, 9 Drawing Sheets

(51) Int. Cl.
    *H02K 1/16* (2006.01)
    *H01F 41/02* (2006.01)
(52) U.S. Cl.
    CPC ...... *H02K 15/026* (2013.01); *Y10T 29/49075* (2015.01)

(56) References Cited

U.S. PATENT DOCUMENTS

| | | |
|---|---|---|
| 4,403,489 A | 9/1983 | Munsterman |
| 4,507,947 A | 4/1985 | Stanley |
| 4,532,843 A | 8/1985 | Miyama |
| 4,619,028 A | 10/1986 | Neuenschwander |
| 4,738,020 A | 4/1988 | Neuenschwander |
| 5,755,023 A | 5/1998 | Neuenschwander |
| 5,799,387 A | 9/1998 | Neuenschwander et al. |
| 5,809,638 A | 9/1998 | Neuenschwander |
| 5,907,210 A * | 5/1999 | Chaix .................. H02K 17/16 310/213 |
| 5,942,831 A * | 8/1999 | Yamada ............... H02K 15/024 29/596 |
| 6,000,119 A | 12/1999 | Neuenschwander et al. |
| 6,131,268 A | 10/2000 | Neuenschwander |
| 6,163,949 A | 12/2000 | Neuenschwander et al. |
| 6,195,875 B1 | 3/2001 | Neuenschwander |
| 6,484,387 B1 | 11/2002 | Lee |
| 6,636,137 B1 | 10/2003 | Neuenschwander |
| 6,742,239 B2 | 6/2004 | Lee et al. |
| 6,745,458 B2 | 6/2004 | Neuenschwander |
| 6,952,064 B2 * | 10/2005 | Hiwaki .................. H02K 1/146 310/214 |
| 6,995,494 B2 * | 2/2006 | Haugan ................. H02K 21/24 310/156.32 |
| 7,062,841 B2 | 6/2006 | Neuenschwander |
| 7,654,123 B2 | 2/2010 | Patterson |
| 7,667,367 B2 * | 2/2010 | Matsuo ................ H02K 15/022 310/216.008 |
| 8,916,254 B2 * | 12/2014 | Nagai ..................... H02K 1/16 310/216.004 |
| 2014/0139067 A1 * | 5/2014 | Neuenschwander H02K 15/026 310/216.005 |

OTHER PUBLICATIONS

Office Action dated Dec. 9, 2016 in U.S. Appl. No. 14/056,679.

* cited by examiner

FIG_7

DIE ASSEMBLY AND METHOD FOR MANUFACTURING WOUND MOTOR LAMINATED ARTICLE

CROSS-REFERENCE TO RELATED APPLICATION

This application claims the benefit under Title 35, U.S.C. §119(e) of U.S. Provisional Patent Application Ser. No. 61/715,710, filed Oct. 18, 2012 and entitled "DIE ASSEMBLY AND METHOD FOR MANUFACTURING WOUND MOTOR LAMINATED ARTICLE," the entire disclosure of which is hereby expressly incorporated by reference herein.

BACKGROUND OF THE INVENTION

1. Technical Field

The present disclosure relates generally to a progressive stamping die assembly apparatus, and more particularly to an apparatus for the manufacture of a wound stator core made from a continuous strip of material.

2. Description of the Related Art

The manufacture of parts, e.g., stators and rotors for electric motors, ignition assembly cores, or other parts which employ stacked laminas is well known in the art. Typically, individual laminas are blanked from a continuous strip of stock material and are then stacked and bound together to form the completed part. Progressive die assemblies are used for producing such lamina stacks, in which a strip of lamina material is fed through a sequence of punching steps to progressively form the individual laminas to the desired end configurations.

Individual laminas are typically formed as a plurality of discreet parts which are layered over one another to create a lamina stack having the overall shape and dimension of the desired finished part. For stator cores, each lamina within the stack includes a central opening, a plurality of pole piece portions extending radially into or away from the central opening, and winding slots between each neighboring pair of pole piece portions.

Such stacked laminar articles are made from a plurality of individual laminas which are manufactured as separate discrete layers that are then stacked upon one another. This stack of discrete layers are then joined to one another to form the final laminated article such as a stator core or other component. Stated another way, the flat, generally planar material from which the individual laminas are formed creates generally planar laminas which are arranged perpendicular to the longitudinal axis of the final laminated article, such as the axis of a generally cylindrical stator core.

Alternatively, a wound laminated article may be created by winding a continuous strip of material around a spool, in the manner of a spooled tape, such that the substantially cylindrical stator core is created by winding several layers of the continuous strip over one another.

What is needed is a die assembly and method which is an improvement over the foregoing.

SUMMARY

The present disclosure provides a method and apparatus for forming a metal article, such as a stator core from a continuous strip of wound sheet stock material, in which the sheet stock material is converted from the sheet stock to a formed material including winding slot cutouts. This strip of formed material is then wound around a spool into a finished article, such as a stator core, with the plane of the incoming formed strip material remaining substantially parallel with a longitudinal axis of the finished article.

The winding slot cutouts in the formed material are maintained at a substantially constant width throughout most of the radial extent of the resulting winding slots in the finished article, except that one or more of the first and/or last wound layers (i.e., the radially innermost and radially outermost layers) may define winding slot cutouts that are wider than the other winding slot cutouts. Where several radial layers are altered in this way, the cutout widths are progressively expanded such that the resulting winding slot has terminal ends with edges that are effectively "radiused" or rounded. This rounded edge profile protects windings projecting radially into or outwardly from the winding slots near the edge of such slots.

In one form thereof, the present disclosure provides a production machine, the assembly including: a punch press comprising: an upper die assembly comprising a plurality of dies longitudinally arranged with respect to one another along a die path direction; a lower die assembly configured to cooperate with the plurality of dies of the upper die assembly to punch a plurality of lamina features into a strip of material substantially within the plane of the strip; a material feed path passing between the upper die assembly and the lower die assembly along a direction transverse to the die path direction, such that the plurality of dies are selectively engageable with the material feed path to selectively punch one of the plurality of lamina features into the strip; a rewinding apparatus positioned downstream of the punch press, the rewinding apparatus rotatable to take up material from the material feed path after the lamina features are punched into the strip.

In another form thereof, the present disclosure provides a method of producing a wound article from a strip of material, the method including: feeding a strip of bulk material to a punch press; punching a plurality of winding slot cutouts into the bulk material to create a formed material; winding the formed material around itself such that a substantially cylindrical structure is created, the plurality of winding slot cutouts selectively align with one another to create at least one winding slot, wherein the step of punching a plurality of winding slot cutouts comprises punching a cutout having a first cutout width for intermediate radial layers of the wound formed material and a second cutout width for at least one of an radially innermost and radially outermost layers of the wound formed material, the second cutout width greater than the first cutout width such that at least one axial end of the winding slot defines a rounded corner.

In yet another form thereof, the present disclosure provides a stator core including: a central opening bounded at its periphery by an innermost layer having at least one innermost winding slot cutout having an innermost cutout width; an outermost layer radially spaced from the innermost layer and having at least one outermost winding slot cutout having an outermost cutout width; and a main stator body including a plurality of intermediate layers between the innermost layer and the outermost layer, each of the plurality of intermediate layers having at least one intermediate winding slot cutout having an intermediate cutout width, wherein the innermost layer, outermost layer and intermediate layers are formed from a continuous strip of wound material such that the innermost winding slot cutout, the outermost winding slot cutout and the intermediate winding slot cutouts are aligned with one another to form a winding slot, and wherein at least one of the innermost cutout width and the outermost cutout width is larger than the intermediate cutout width, whereby the winding slot approximates a rounded edge and a radial terminal end thereof.

BRIEF DESCRIPTION OF THE DRAWINGS

The above-mentioned and other features of the disclosure, and the manner of attaining them, will become more apparent and will be better understood by reference to the following description of an embodiment of the invention taken in conjunction with the accompanying drawings, wherein.

Corresponding reference characters indicate corresponding parts throughout the several views. The exemplification set out herein illustrates an embodiment of the disclosure and such exemplification is not to be construed as limiting the scope of the invention in any manner.

DETAILED DESCRIPTION

Figure 1:
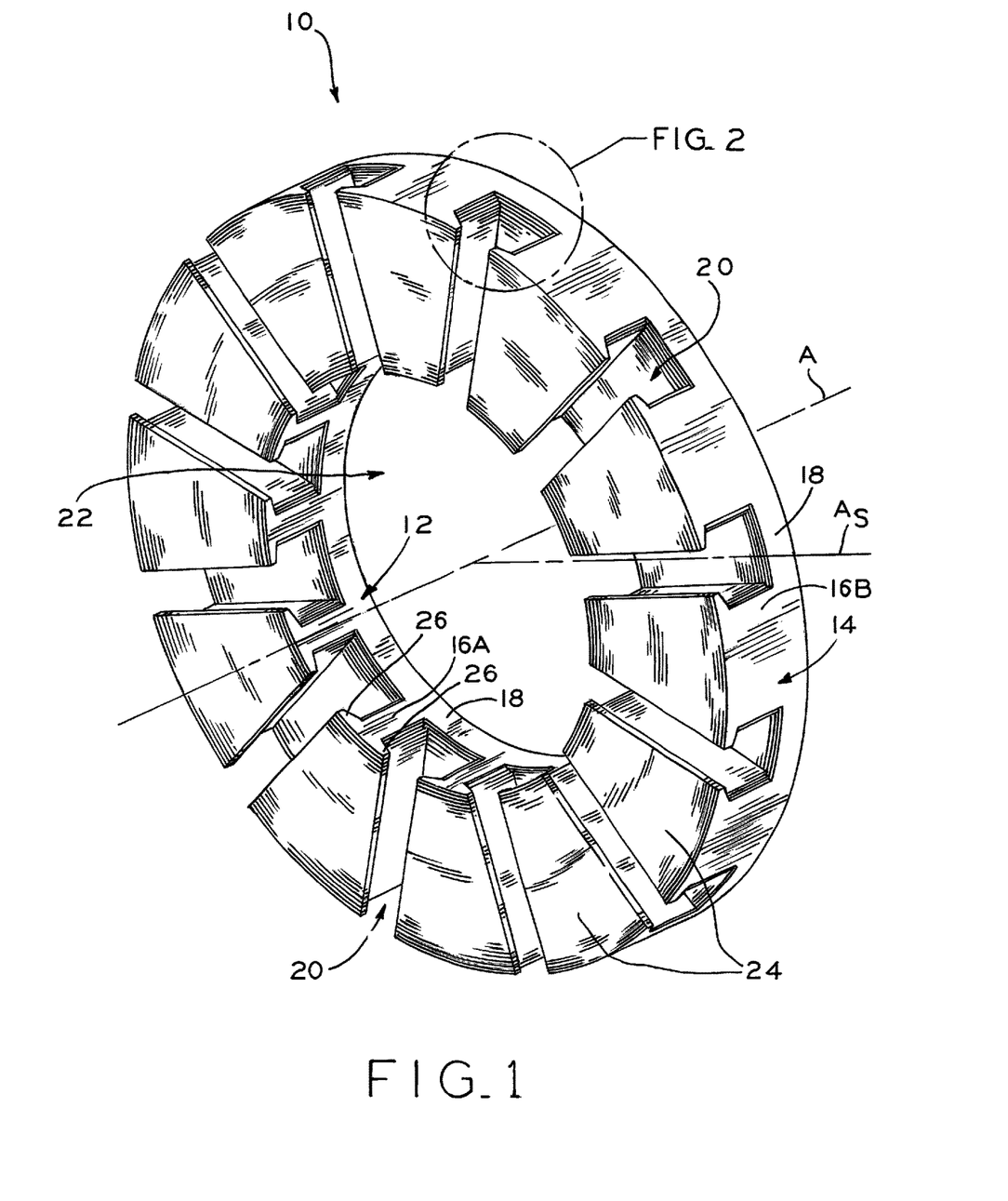
FIG. 1 is a perspective view of an annular laminated article made from a continuous strip of material in accordance with the present disclosure.

Referring now to FIG. 1, the present disclosure provides wound laminated article 10, formed as a stator core having a plurality of winding slots 20 (e.g., twelve slots 20 as illustrated) extending from radially innermost layer 12 to radially outermost layer 14 of the continuous strip of material used to form article 10, as described in detail below. Interposed between neighboring pairs of winding slots 20 are winding poles 24, which define a relatively narrow width at innermost pole pieces 16A and a relatively wider width at outermost pole pieces 16B, as also described below. Winding poles 24 extend axially outwardly from base 18 of article 10 along longitudinal axis A defined by the generally cylindrical arrangement of article 10 as shown. Winding poles 24 optionally include lateral extensions 26 disposed axially opposite article base 18 which partially (but not fully) enclose winding slots 20. It is also contemplated that lateral extensions 26 can be omitted such that the sidewalls of slots 20 extends axially to the axial terminal end of slots 20.

When used in a motor or generator assembly, for example, bundles of windings are received within winding slots 20 and interconnected with one another. When article 10 is placed into a rotor (not shown), the windings can electrically interact with the rotor to form a rotor system capable of converting electrical charge to a motive force. Such rotor systems are used in electromotive devices such as electric generators, electric motors, sirens or the like.

Winding wire 28 (FIG. 2) may form a part of a bundle of windings, protruding radially outwardly from winding slot 20. Wire 28 is positioned such that, in some cases, wire 28 is made to bend sharply around outer layers 14, 30, 32 of wound laminated article 10 as illustrated. As described in further detail below, radially outermost layer 14 and underlying outer layers 30, 32 may define progressively narrowing winding slot widths W5, W4, W3 et seq to provide a generally rounded edge profile at the radial end of winding slot 20, thereby avoiding or minimizing damage to winding wire 28 and other sharply bending portions of the motor windings.

Figure 4:
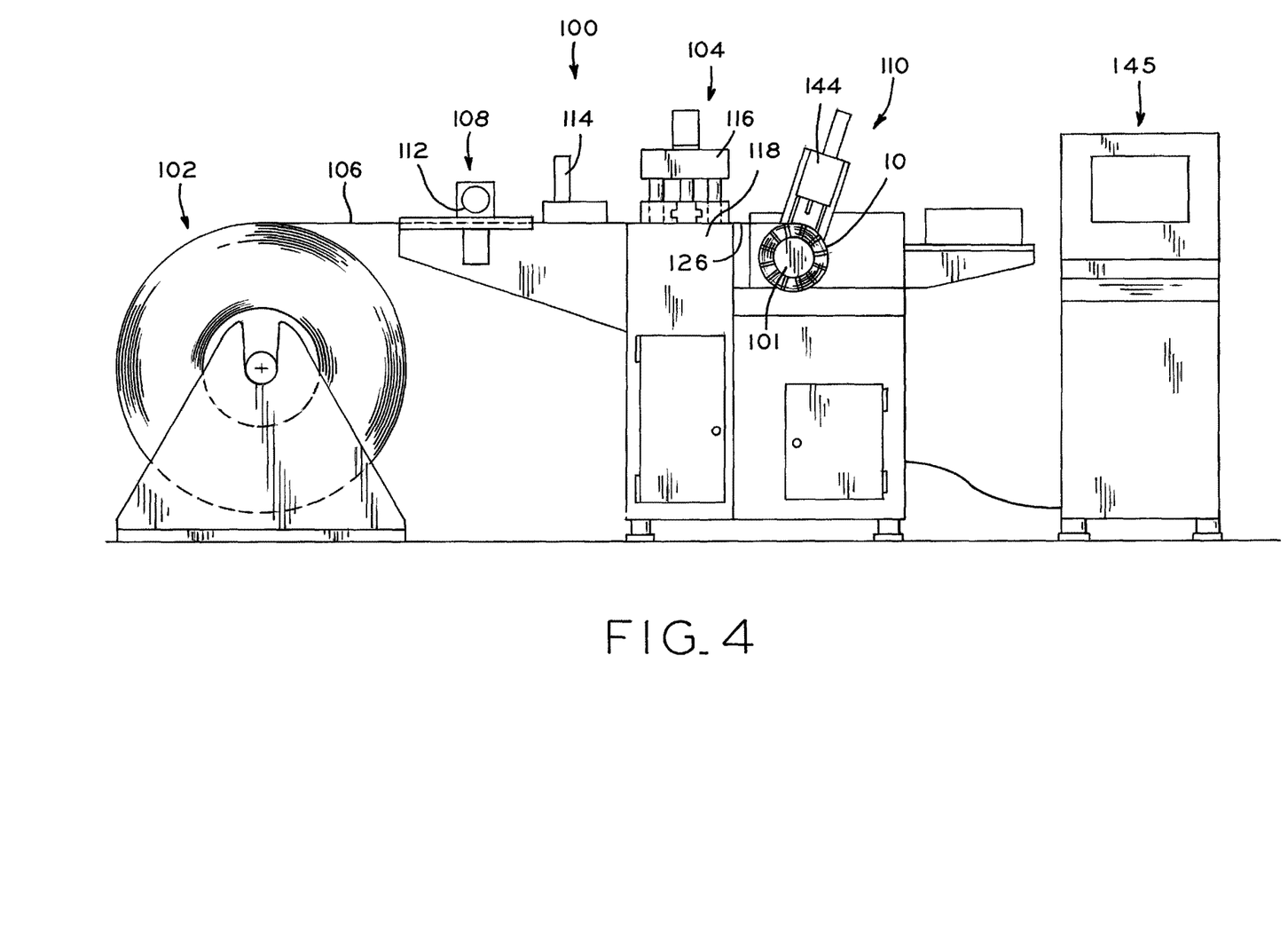
FIG. 4 is a side elevation view of a production apparatus including a die assembly made in accordance with the present disclosure and design for production of a continuously wound laminated article in accordance with the present disclosure.

Turning now to FIG. 4, wound laminated article 10 is formed by winding a continuous strip of material around a circular core, such as takeup reel 101, starting with radially innermost layer 12 (FIG. 1) and progressively winding additional layers of material thereupon until a desired finished diameter is reached at radially outermost layer 14. Such winding is accomplished in the manner of a spiral, in similar fashion to the winding of tape onto a spool, such that the finished product is substantially cylindrical as illustrated.

As described in detail below, each successive layer of formed material 126 wound around takeup reel 101 is geometrically sized and configured by punch press 104 to precisely overlay the preceding layer such that winding slots 20 extend continuously radially outwardly from innermost layer 12 to outermost layer 14. Stated another way, all winding slot cutouts 150 (FIGS. 8A, 8B) are formed to align with one another upon winding, such that winding slots 150 extend in an uninterrupted fashion throughout their radial extents, and have a desired width profile (such as with a standard width across the radial extent as shown).

Figure 2:
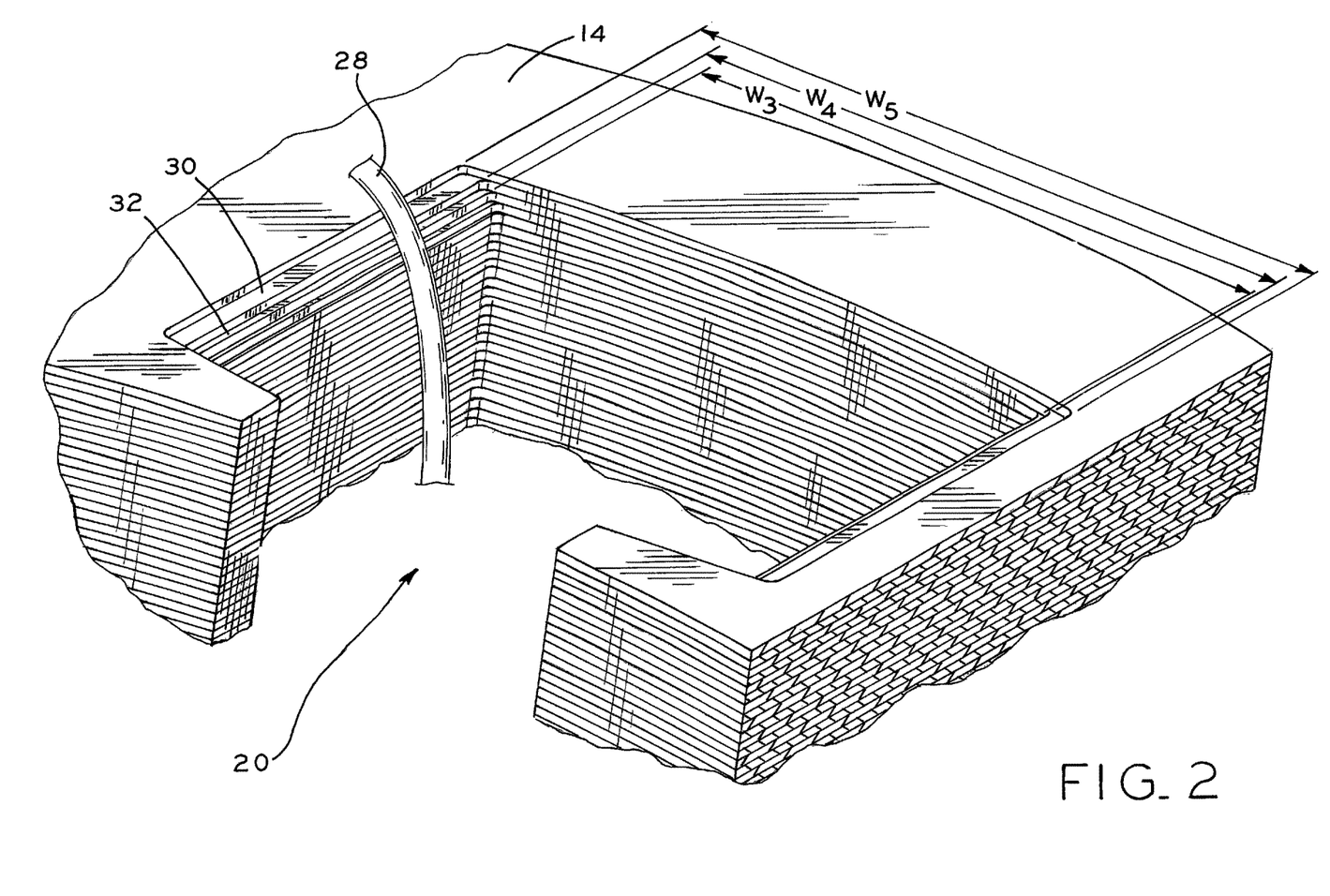
FIG. 2 is a perspective view of a portion of the laminated article shown in FIG. 1, illustrating progressively widening winding slot cutouts to approximate a rounded radially outward edge of the winding slot.

However, as noted herein, the width of winding slots 20 flares outwardly at the radial terminal ends of winding slots 20, i.e., the ends adjacent to innermost layer 12 and outermost layer 14 (FIG. 2). These outward flares provide an approximation of a "radiused" or rounded lateral edge at such radial ends to protect winding wires engaging these edges, such as winding wire 28 as shown in FIG. 2.

Figure 3:
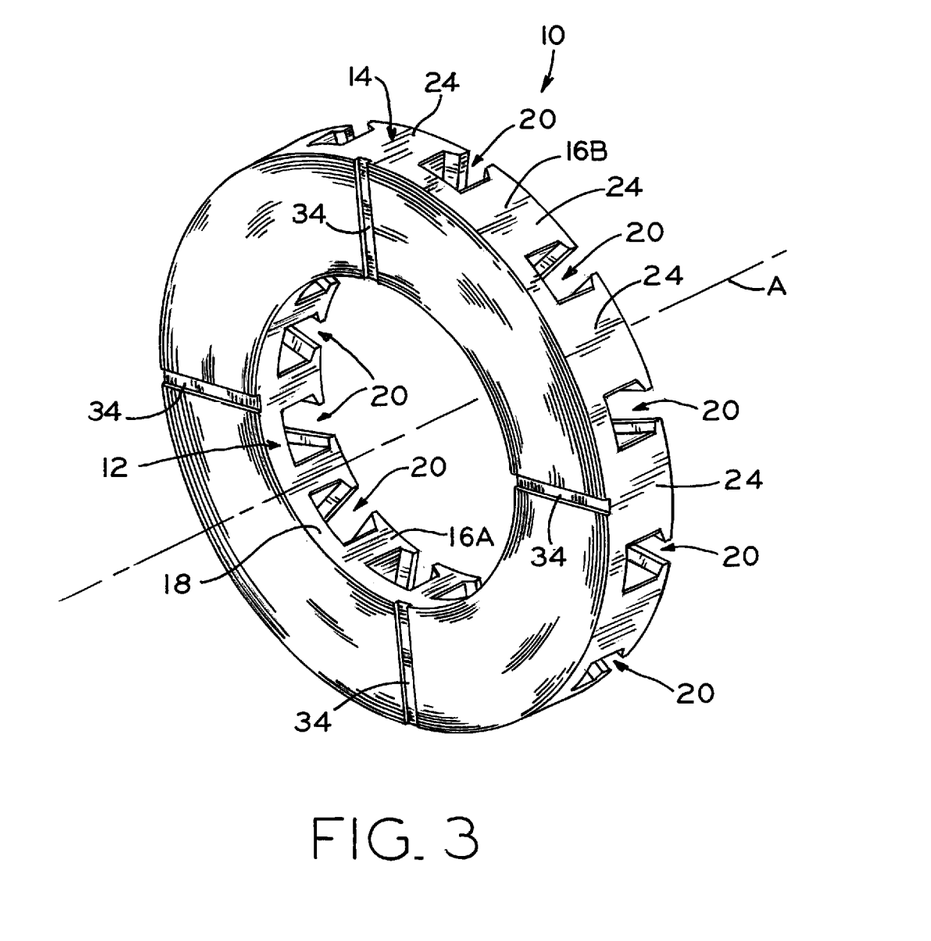
FIG. 3 is a rear perspective view of the laminated article shown in FIG. 1, illustrating weld slots formed therein.

In addition to formation of such uninterrupted winding slots 20, the process of creating wound article 10 (i.e., stamping bulk material 106 and rewinding formed material 126 as described below) also creates weld slots 34 in a surface of article base 18 opposite winding poles 24, as shown in FIG. 3. Upon completion of the winding process which finishes article 10, weld slots 34 can be used to permanently bind each adjacent radial layer of article 10 to one another to create a unitary, substantially cylindrical laminated article such as the stator core shown in the exemplary embodiment of the present figures.

Winding slot cutouts 150 are aligned with one another in wound article 10 such that winding slots 20 each extends radially outwardly along winding respective slot axes, such as axis $A_S$ shown in FIG. 1. Slots 20 extend directly radially outwardly, such that their respective longitudinal axes (including axis $A_S$) each intersect the center of the circle defined by innermost and outermost layers 12, 14 at axis A. In the illustrated embodiment, slots 20 also defines a constant width and cross-sectional geometry their longitudinal extents, except for the inner and outer layers with progressively widening slot cutouts 150 as described herein.

Figure 9A:
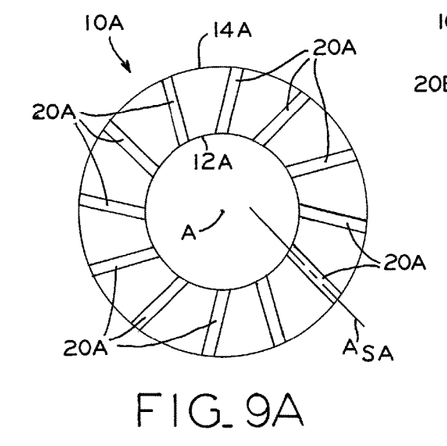
FIG. 9A is a front elevation view of an alternative stator core made in accordance with the present disclosure, in which the stator slots are skewed with respect to a radial outward direction.
Figure 9B:
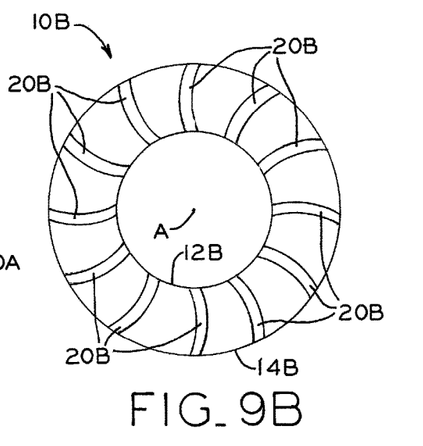
FIG. 9B is a front elevation view of another alternative stator core made in accordance with the present disclosure, in which the stator slots are arcuate.
Figure 9C:
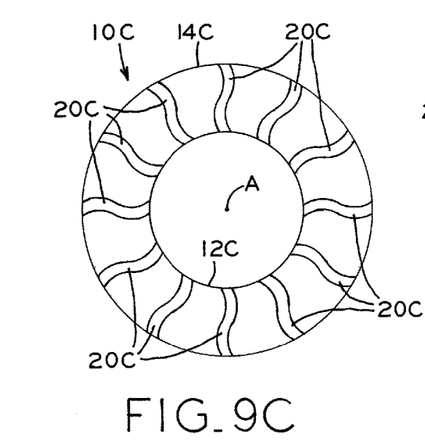
FIG. 9C is a front elevation view of yet another alternative stator core made in accordance with the present disclosure, in which the stator slots are double-skewed.
Figure 9D:
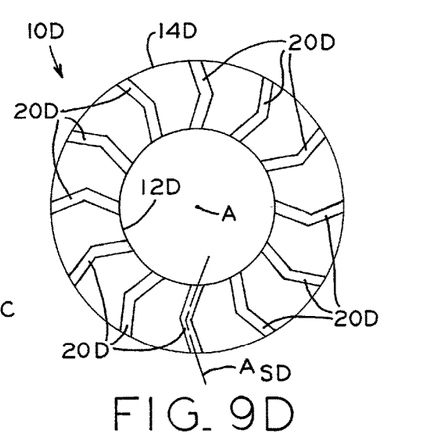
FIG. 9D is a front elevation view of still another alternative stator core made in accordance with the present disclosure, in which the stator slots are double-arcuate.
Figure 9E:
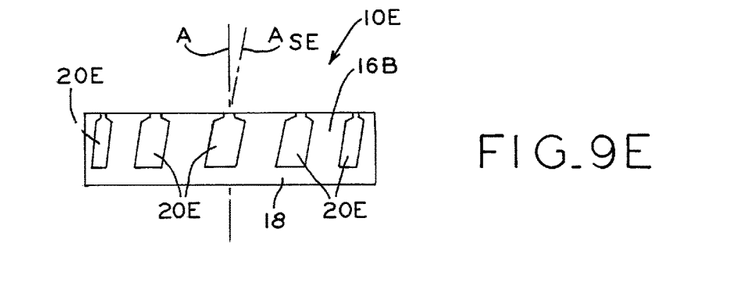
FIG. 9E is a side elevation view of another alternative stator core made in accordance with the present disclosure, in which the stator slots are skewed with respect to an axial direction.

However, it is contemplated that the nature of the alignment of winding slot cutouts 150 can be altered to produce any longitudinal and cross-sectional geometry for winding slots 20, as required or desired for a particular application. Referring to FIG. 9A, for example, winding slots 20A of alternative wound article 10A may define axes $A_{SA}$ which remain substantially perpendicular with respect to axis A but are skewed with respect to the strictly radial directionality of axis $A_S$ of slot 20 (FIG. 1). Thus, axis $A_{SA}$ never intersects axis A defined by article 10A. FIG. 9B illustrates alternative article 10B with winding slots 20B having an arcuate longitudinal axial profile. FIG. 9C illustrates alternative article 10C with winding slots 20C having a double-arcuate longitudinal axial profile, in which the curvature of the arcuate profile changes between innermost layer 12C and outermost layer 14C. FIG. 9D illustrates alternative article 10D with winding slots 20D having a double-skewed longitudinal axial profile, in which longitudinal axis $A_{SD}$ angles between innermost layer 12D and outermost layer 14D as shown. Finally, FIG. 9E illustrates alternative article 10E with winding slots 20E having transverse axes $A_{SE}$ which are skewed with respect to axis A of article 10, i.e., transverse axis $A_{SE}$ is substantially parallel to axis A but angled with respect thereto. Moreover, any combination of the above winding slot profile modifications, and any other modifications of profile cross-sectional geometry and/or arrangement, may be utilized in accordance with the present disclosure.

Turning again to FIG. 4, an exemplary method and apparatus for producing wound laminated article 10 will now be described with respect to production machine 100. Production begins with a spool of wound bulk material, shown as material spool 102 in FIG. 4. Although material spool 102 is a convenient solution for providing a continuous feed of bulk material to punch press 104 as described in detail below, it is of course contemplated that such bulk material may be provided in other ways, such as directly from a material production line or from a stack of individual lengths of material.

Bulk material 106 is fed from material spool 102 to intake 108 of production machine 100. Intake 108 may include various apparatuses for preprocessing of the bulk material 106, as required or desired for a particular design and desired end product. For example, a first preprocessing step may be performed at intake 108 by material cleaner 112, which removes particulate matter, grease, or other impurities from one or both sides of bulk material 106. Removal of such impurities may be desirable to maintain fine control over the subsequent punching and rewinding of formed material 126. In addition, intake may include edge guide 114 to monitor and/or adjust the alignment of bulk material 106 with respect to punch press 104. Edge guide 114 maintains bulk material 106 in a desired spatial arrangement with respect to upper and lower die assemblies 116, 118 of punch press 104, even if bulk material 106 is unevenly wound upon material spool 102. Other preprocessing steps and/or apparatuses may be employed as required or desired for a particular application, such as for trimming bulk material 106 to a desired width, creating cuts or perforations at desired locations, printing upon material surfaces, or the like.

Upon exiting a downstream end of intake 108, bulk material 106 enters the upstream end of punch press 104. As used herein, an "upstream" direction is toward the source of bulk material 106 (e.g., material spool 102), while a "downstream" direction is opposed to the upstream direction and oriented toward the destination of formed material 126 (e.g., takeup reel 101). Production machine 100 generally moves materials 106, 126 in a downstream direction along feed direction DF, though it is appreciated that intermittent upstream travel of materials 106, 126 may sometimes be desirable to facilitate certain material processing steps.

Figure 5:
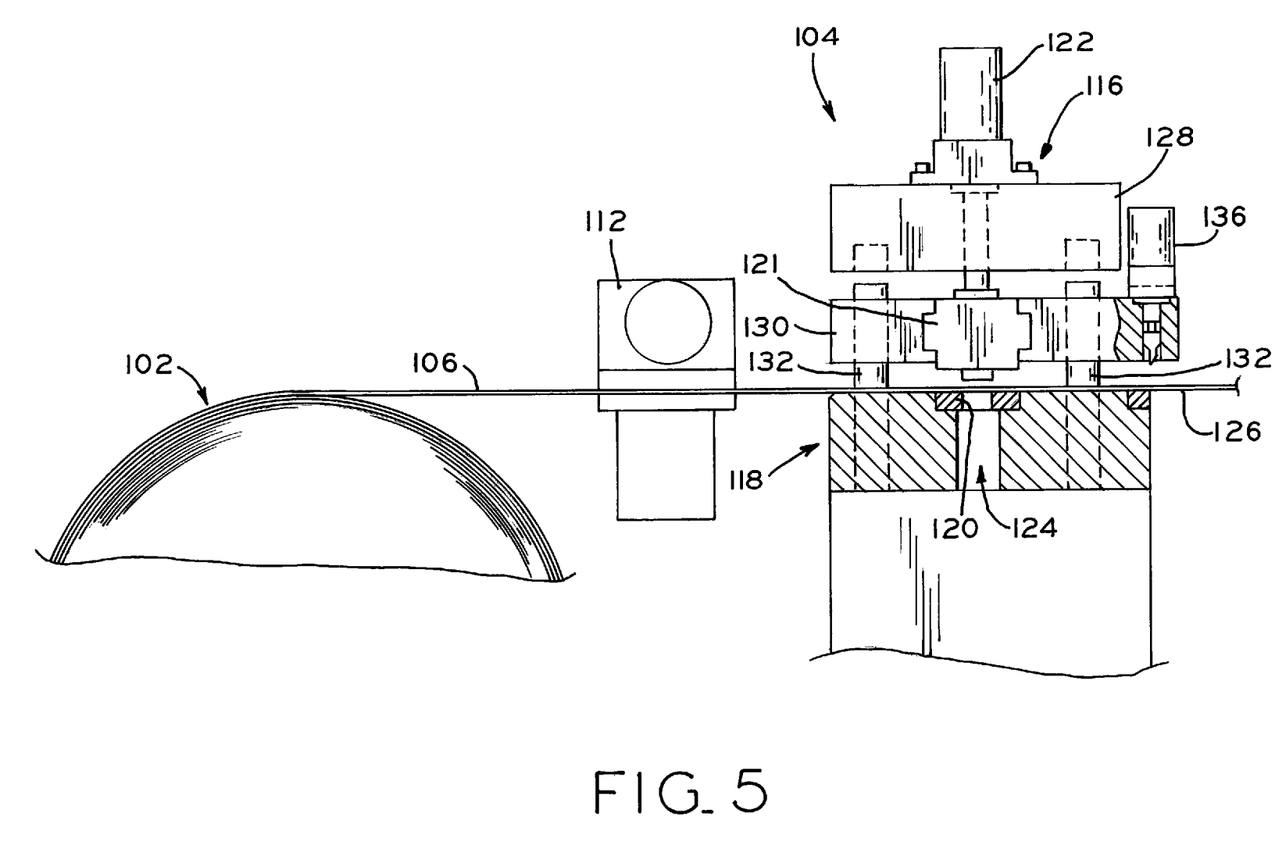
FIG. 5 is a partial elevation, cross-sectional view of a portion of the production apparatus shown in FIG. 4, illustrating the die assembly.

As best illustrated in FIG. 5, punch press 104 includes lower die assembly 118 having die insert 120 received therein. Upper die assembly 116 includes upper die 121 disposed above lower die assembly 118 and acted upon by press 122. When press 122 pushes upper die assembly 116 downwardly, upper die 121 engages die insert 120 to stamp out a predetermined shape from bulk material 106. When such stamping is complete, the removed material, known as a blank, is allowed to fall away from material 106 via chute 124 formed in lower die assembly 118, while formed material 126 advances toward rewinder 110 as described further below. In the illustrated embodiment of FIG. 5, upper die assembly 116 includes press plate 128 and die holder 130, with press plate 128 selectively actuating under the force of press 122 upon command from controller 145 (FIG. 4). Die holder 130 is guided along guide rails 132 as holder 130 is urged downwardly by press plate 128. Guide rails 132, in turn, are received within lower die assembly 118, thereby ensuring proper alignment between upper and lower die assemblies 116, 118 during the punching process.

Figure 6:
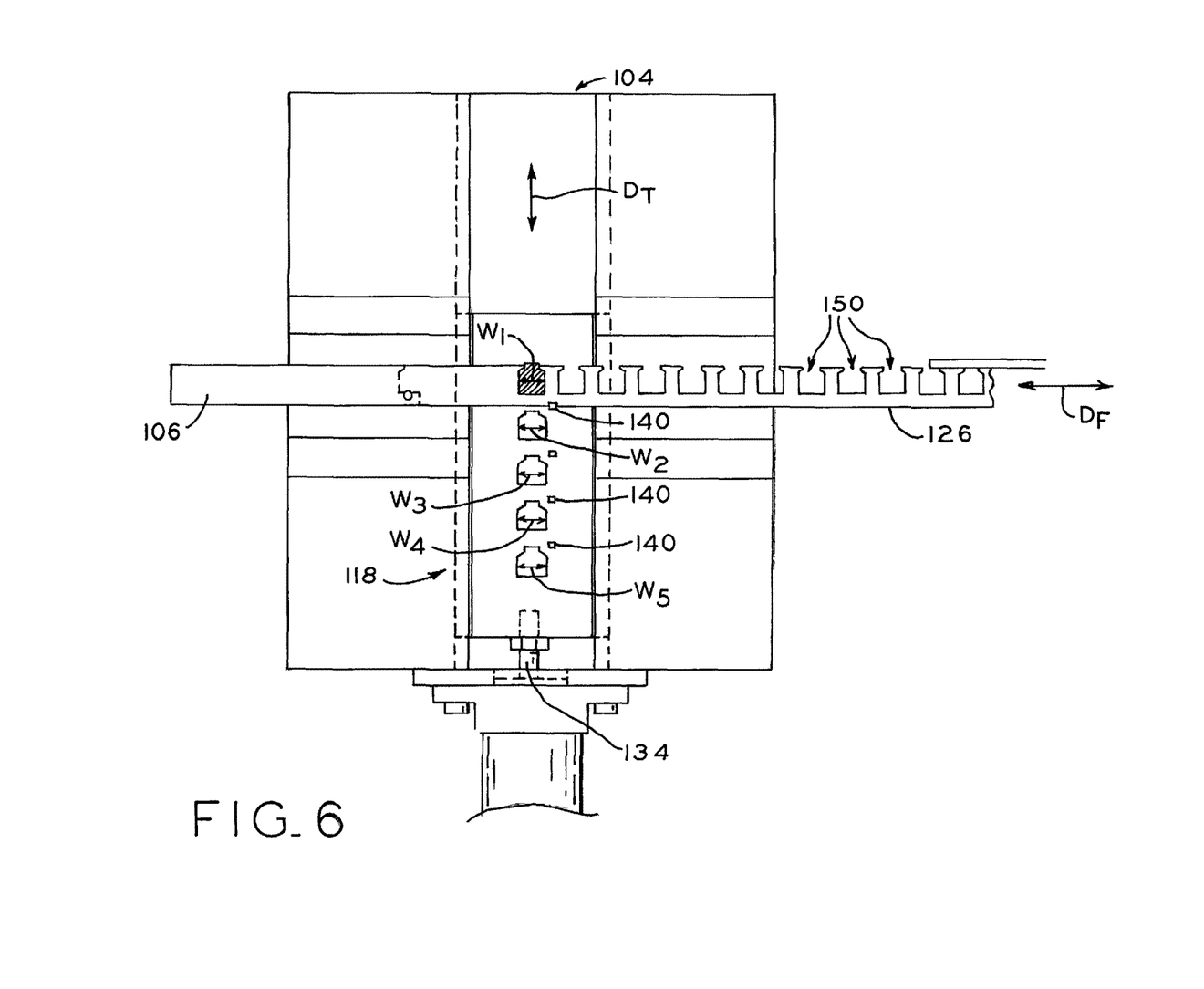
FIG. 6 is a top plan view of the die assembly shown in FIGS. 4 and 5, illustrating a plurality of dies transversely movable with respect to the feed path of the material.

Turning now to FIG. 6, a plan view of punch press 104 illustrates the transversely movable functionality of upper and lower die assemblies 116, 118 (though only lower die assembly 118 is shown for clarity). This transverse movement functionality enables variable widths $W_1$ through $W_5$ of winding slot cutouts 150 at selected layers of article 10 (e.g., innermost and outermost layers 12, 14), and thereby enables winding slots 20 with rounded edges as described herein.

In FIG. 6, lower die 118 having a plurality of die inserts 120 of varying widths $W_1, W_2, W_3, W_4, W_5$ is transversely movable along direction $D_T$, which runs transverse to feed direction $D_F$ of bulk and formed materials 106, 126. As described in further detail below, upper and lower die assemblies 116, 118 are advanced transversely along direction $D_T$ by actuator 134 at the beginning and end stages of formation of wound article 10, such that relatively wider dies are employed for the first several innermost and last several outermost layers (including innermost layer 12 and outermost layer 14, respectively) to produce the progressively widening profile of winding slot 20 at the terminal radial ends thereof. This progressively widening profile, in turn, creates the radiused or rounded appearance of such axial ends to protect winding wire 28 (FIG. 2) and other adjacent winding materials.

One exemplary system and method for transversely moving a die station with respect to other adjacent structures is disclosed in U.S. Pat. No. 6,742,239, filed Oct. 1, 2002 and entitled PROGRESSIVE STAMPING DIE ASSEMBLY HAVING TRANSVERSELY MOVABLE DIE STATION AND METHOD OF MANUFACTURING A STACK OF LAMINAE THEREWITH, the entire disclosure of which is hereby expressly incorporated by reference herein. Particular structures and systems for providing motive force to move upper and lower die assemblies 116, 118 may be similarly arranged to the system of U.S. Pat. No. 6,742,239, or may be differently arranged (i.e., hydraulically or pneumatically driven systems, manual slides, and the like).

Turning back to FIG. 5, punch press 104 further includes pin punch 136, which is configured and positioned to place pin hole 138 (FIG. 8C) into a leading edge of formed material 126. Pin hole 138 is sized and positioned to engage a correspondingly formed pin (not shown) in takeup reel 101 upon initial engagement therebetween, such that the engagement draws formed material 126 into the initial wrap around takeup reel 101 (thereby forming radially innermost layer 12).

Turning back to FIG. 6, lower die assembly 118 may include weld apertures 140, which are engaged by a correspondingly formed weld aperture die (not shown) in upper die assembly 116 to form weld slot notches 142 in formed material 126 at selected, periodically spaced locations along bulk material 106. Weld slot notches 142 cooperate to form weld slots 34 (FIG. 3) after article 10 is wound around takeup reel 101 as described in detail below.

Turning back to FIG. 4, the downstream end of production machine 100 includes rewinder 110 having takeup reel 101 and material measurement device 144. Measurement device 144 measures the distance between itself and the material being collected upon takeup reel 101, such as via sonar measurement, laser measurement, or the like. Signals collected from measurement device 144 indicative of the measured distance between device 144 and the adjacent layer of formed material 126 are relayed to controller 145, which is operably connected to takeup reel 101.

Figure 7:
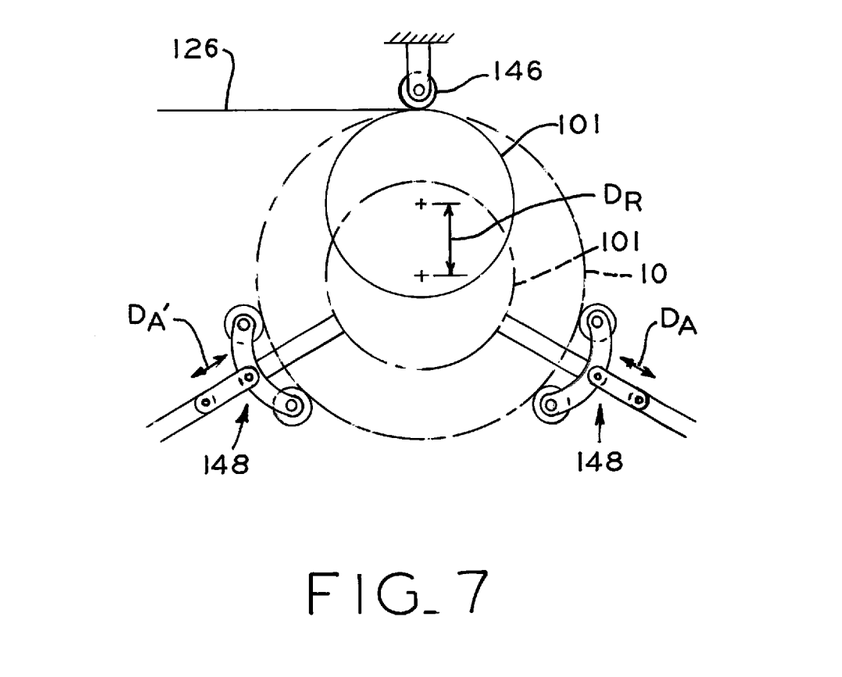
FIG. 7 is a side elevation view of a takeup system made in accordance with the present disclosure, including a movable takeup reel and movable pressure rollers.

Turning to FIG. 7, controller 145 activates takeup reel 101 when formed material 126 is received thereupon. Takeup reel 101 is initially in an upper position directly abutting a spatially fixed pressure roll 146. Formed material 126 is progressively collected upon takeup reel 101, starting with radially innermost layer 12 and progressing with another layer for each 360 degree rotation of takeup reel 101. As this progressive build up of wound formed material 126 collects, takeup reel 101 moves downwardly along direction $D_R$. This downward movement may be controlled by controller 145 in response to the signal received from measurement device 144. More particularly, controller 145 seeks to maintain a constant measurement reading from measurement device 144 such that pressure roll 146 is always in light but firm abutting contact with the incoming stream of formed material 126.

To compensate for slight variations or inconsistencies in the downward travel of takeup reel 101, pressure roll 146 may have a slight give (e.g., provided by an internal spring preload) to maintain such constant pressure upon incoming formed material 126). In addition, auxiliary pressure roll assemblies 148 may be provided along the outer surface of takeup reel 101, as shown in FIG. 7. Auxiliary pressure roll assemblies 148 are movable along direction $D_A$, $D_A'$ to maintain constant contact along the outer surface of the collected formed material 126. In an exemplary embodiment, auxiliary pressure roll assemblies 148 are spring loaded to provide constant pressure against the adjacent material. In the illustrated embodiment of FIG. 7, auxiliary pressure roll assemblies 148 are shown abutting the outer surface of laminated article 10 after collection of formed material 126 is complete.

The motive force for advancing materials 106, 126 may be provided by takeup reel 101, which "pulls" such material along direction $D_F$ (FIG. 6). However, the amount of angular movement of reel 101 needed to effect a given linear advancement of materials 106, 126 along direction $D_F$ changes depending on the diameter of the partially completed wound article 10. Controller 145 may perform the mathematical calculations to convert the angular rotations into linear distance based on the effective diameter of the partially finished article 10. Alternatively, a dedicated driven roller may be provided to advance materials 106, 126 by a set amount regardless of the rewind diameter.

A method of operation of production machine 100 to produce wound laminated article 10 will now be described.

As noted above, bulk material 106 is first provided from material spool 102 to punch press 104 via intake 108. Initially, punch press 104 is configured such that the widest die insert 120 and the associated widest die 121 are aligned below and above bulk material 106. This configuration will allow radially innermost layer 12 to have winding slot cutout 150 (FIG. 8A) defining width $W_5$, which is the widest of all available widths in the present exemplary embodiment. The resulting wider width of winding slot 20 at the inner radial end thereof facilitates creation of the rounded edge (similar to the radially outward rounded edge shown in FIG. 2 and described further herein).

With bulk material 106 so aligned between upper and lower die assemblies 116, 118, punch press 104 is activated by controller 145 to create a first winding slot cutout 150 (FIG. 8A) defining width $W_5$. The next length of bulk material 106 is advanced into alignment with upper and lower die assemblies 116, 118, and the stamping process is repeated. In the present exemplary embodiment shown in FIG. 1, a total of twelve stamping procedures creates innermost layer 12 of article 10, because article 10 includes twelve winding slots 20. Of course, any number of winding slots 20 may be provided, and the initial punching processes utilizing relatively wider width $W_5$ can be replicated as many times as needed to correspond to the desired number of winding slots.

Figure 8A:
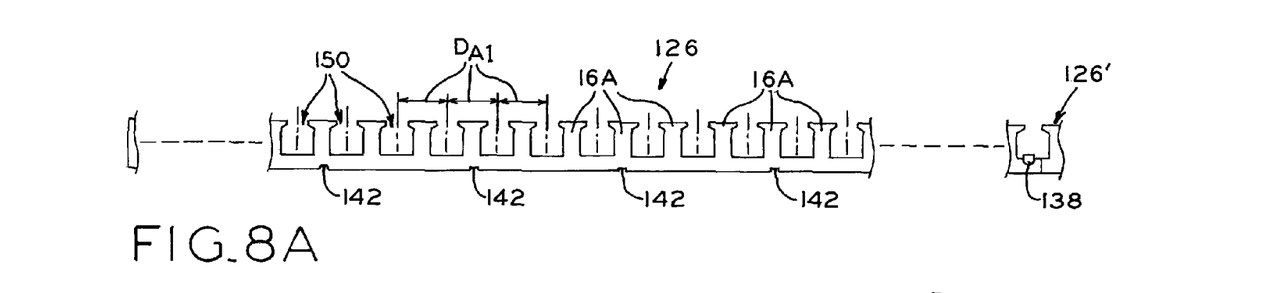
FIG. 8A is a plan view of a punched strip of material capable of being wound into a radially inward layer of the laminated article shown in FIG. 1.

As noted above, bulk material 106 (and the newly finished formed material 126 as shown in FIG. 8A) is advanced by distance $D_{A1}$ between punching of winding slot cutouts 150. Distance $D_{A1}$ is calculated to produce twelve evenly spaced and evenly sized winding slot cutouts 150 around the inner periphery of radially innermost layer 12. Because this periphery is the smallest of any winding around article 10, inner pole pieces 16A (FIGS. 1 and 8A) are relatively narrow.

For the next set of twelve winding slot cutouts 150, upper and lower die assemblies 116, 118 are indexed along direction $D_T$ (FIG. 6) to the next set of die insert 120 and die 121 having width $W_4$, which is slightly smaller than width $W_5$ described above. For the second innermost layer of article 10, another set of twelve winding slot cutouts 150 are punched with the reduced width $W_4$ and taken up on takeup reel 101 over innermost layer 12. As described in detail below with respect to outermost layer 14 and the associated outer layers 30, 32 et seq, (FIG. 2), this width reduction in winding slot cutouts 150 produces the beginning of the radiused or rounded general appearance of the innermost layers of article 10.

In addition, advancement of formed material 126 must now be along a distance slightly larger than distance $D_{A1}$ (FIG. 8a) in order to maintain the alignment of winding slot 20 across this new layer. This is because the second layer including the second set of twelve winding slot cutouts 150 must circumnavigate not only the circumference of takeup reel 101, but also the additional circumference imparted by the presence of the radially innermost layer 12. Controller 145 calculates this incrementally larger distance based on the thickness of formed material 126 and increases the advancement distance accordingly.

In the illustrated embodiment of FIG. 6, five arrangements of die insert 120 and die 121 are provided having five progressively smaller widths $W_5$, $W_4$, $W_3$, $W_2$, $W_1$. With each progressive set of twelve winding slot cutouts 150 (or however many are provided in a full annular set of such cutouts), upper and lower die assemblies 116, 118 are advanced along direction $D_T$ to present the next narrowest width as described above. In this manner, the first five layers wound around takeup reel 101, which become the five innermost layers of article 10, have progressively narrowing winding slot cutout widths $W_5$ through $W_1$. This progressive narrowing imparts a generally radiused or rounded configuration at the innermost radial end of winding slots 20, similar to the radiused configuration at the outermost radial end shown in FIG. 2.

In order to maintain a constant width of winding slot 20 through the next several layers, the die insert 120/die 121 combination having width $W_1$ may be used repeatedly for as many layers as are desired. During this time, with each increase in circumference of article 10 resulting from the addition of another layer of formed material 126 taken up by takeup reel 101, the distance of advancement of material 126 along direction $D_F$ is increased accordingly. By the time radially outermost layer 14 is ready for forming at punch press 104 and takeup reel 101, advancement distance $D_{A2}$ (FIG. 8B) is needed between adjacent neighboring pairs of winding slot cutouts 150 to ensure alignment with cutout slots 20. $D_{A2}$ is substantially larger than $D_{A1}$, as illustrated by comparison to FIGS. 8A and 8B, and is the maximum advancement distance for article 10.

In addition, the final, outermost five layers wound of formed material 126' around article 10 may employ ever increasing widths $W_1$, $W_2$, $W_3$, $W_4$, $W_5$ of winding slot cutouts 150, as shown in FIG. 2. This is accomplished by advancing upper die assembly 116 and lower die assembly 118 along direction $D_T$, in the reverse order as was used for the five innermost layers described above. In FIG. 2, the third from outermost layer 32, second from outermost layer 30 and radially outermost layer 14 are shown for clarity, it being understood that the two layers further inward (i.e., the fourth outermost layer and fifth outermost layer) define winding slot cutouts 150 having widths $W_2$ and $W_1$, respectively. As illustrated, outer layer 32 defines width $W_3$, because winding slot cutouts 150 were created by the die insert 120/die 121 combination defining width $W_3$. Similarly, outer layer 30 defines width $W_4$ and radially outermost layer 14 defines the widest available width, width $W_5$. This arrangement of steadily increasing widths $W_1$ through $W_5$ creates the radiused, rounded appearance at the radially outward axial ends of winding slots 20 as shown in FIG. 2.

The timing and amount of advancement of materials 106, 126, as well as the actuation of punch press 104 and any structures provided in intake 108 are controlled and monitored by controller 145. Controller 145 is programmed to steadily increase the advancement distance from $D_{A1}$ at the beginning of the winding process to $D_{A2}$ at the end of the winding process in order to maintain radial continuity of winding slots 20 as described in detail above.

Controller 145 is also programmed to halt the advance of materials 106, 126 by stopping the driven advancement of takeup reel 101 (or other powered roller), in order to actuate punch press 104 to create winding slot cutout 150, pin hole 138, and/or weld slot notch 142. Edge guide 114 is actuated as necessary by controller 145, or by its own internal controller, to maintain the spatial relationship of bulk material 106 with respect to punch press 104, as noted above. Controller 145 may further monitor the status and operation of material cleaner 112 to ensure proper operation thereof, together with any other systems which may be chosen for intake 108, material spool 102, or the other systems of production machine 100.

Figure 8B:
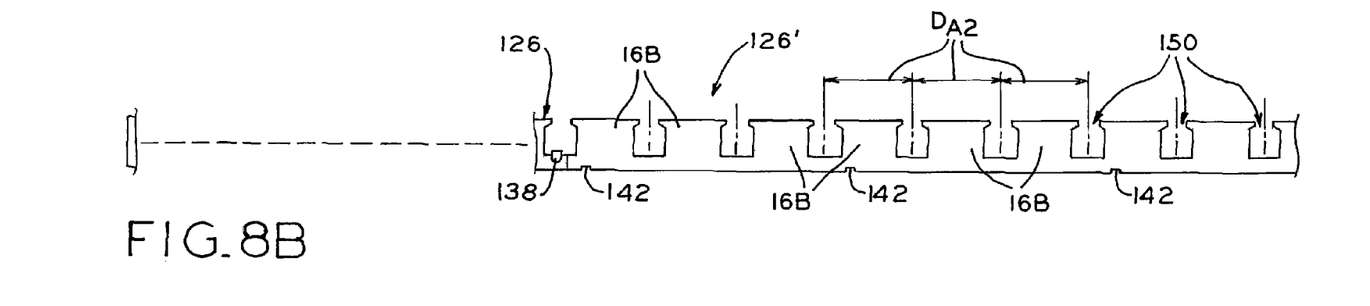
FIG. 8B is a plan view of a material strip stamped into an arrangement in accordance with the present disclosure, in which the stamped arrangement is formed to be wound into a radially outward layer of the laminated article shown in FIG. 1.
Figure 8C:
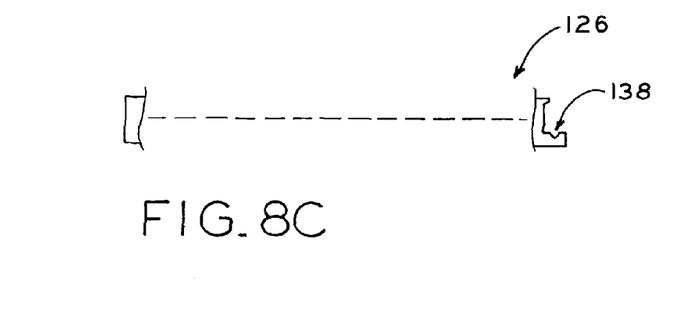
FIG. 8C is a plan view of a leading edge of a strip of material formed in accordance with the present disclosure, illustrating a pin catch aperture sized to engage a takeup pin formed on the takeup reel of FIG. 7.

When radially outermost layer 14 is complete and wound upon article 10, formed material 126' may be severed and the process may restart by again beginning creation of formed material 126, as illustrated in FIG. 8B. In this way, continuous material processing may take place without any substantial interruption. Laminated article 10 may be removed from takeup reel 101, and fixed in its finished form by welding the various layers of formed material 126, 126' to one another by welding along weld slots 34.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of producing a wound article from a strip of material, the wound article defining axial and radial directions, said method comprising:
   feeding a continuous strip of bulk material to a punch press;
   punching a plurality of winding slot cutouts into the bulk material to create a formed material;
   winding the formed material around itself such that a substantially cylindrical structure is created having a central opening with a central axis along the axial direction and bounded at its periphery by an innermost layer having at least one innermost winding slot cutout having an innermost cutout width, an outermost layer radially spaced from the innermost layer and having at least one outermost winding slot cutout having an outermost cutout width, and a main stator body including a plurality of intermediate layers between the innermost layer and the outermost layer, each of the plurality of intermediate layers having at least one intermediate winding slot cutout having an intermediate cutout width, the plurality of winding slot cutouts selectively aligned with one another to create at least one winding slot, wherein said step of punching a plurality of winding slot cutouts comprises punching a cutout having a first cutout width for intermediate radial layers of the wound formed material and a second cutout width for at least one of an radially innermost and radially outermost layers of the wound formed material, the second cutout width greater than the first cutout width such that at least one axial end of the winding slot approximates a rounded edge at a radial terminal end thereof; and winding a plurality of winding wires in the winding slot, the winding wires bent around and following the rounded edge of the winding slot.

2. The method of claim 1, wherein said punching and winding steps further comprise forming a plurality of intermediate layers disposed proximate the innermost layer, the intermediate layers having widths which progressively increase as the intermediate layers approach the innermost layer.

3. The method of claim 1, wherein said punching and winding steps further comprise forming a plurality of intermediate layers disposed proximate the outermost layer, the intermediate layers having widths which progressively increase as the intermediate layers approach the outermost layer.

4. The method of claim 1, wherein said winding slots, when viewed axially from a front end of said stator core, have axes extending from said outermost layer to said innermost layer which are perpendicular to said central axis but skewed with respect to said central axis, said winding slot axes not intersecting said central axis.

5. The method of claim 1, wherein said winding slots, when viewed axially from a front end of said stator core, have axes extending from said outermost layer to said innermost layer which are perpendicular to said central axis and have an arcuate longitudinal axial profile.

6. The method of claim 1, wherein said winding slots, when viewed axially from a front end of said stator core, have axes extending from said outermost layer to said innermost layer which are perpendicular to said central axis and have a double arcuate longitudinal axial profile, in which a curvature of the arcuate profile changes between said innermost layer and said outermost layer.

7. The method of claim 1, wherein said winding slots, when viewed axially from a front end of said stator core, have axes extending from said outermost layer to said innermost layer which are perpendicular to said central axis and have a double skewed longitudinal axial profile, in which each winding slot includes two axes disposed at an angle with respect to each other and perpendicular to said central axis, said axes not intersecting said central axis.

8. The method of claim 1, wherein said winding slots have transverse axes which are skewed with respect to said central axis.

9. A stator core defining axial and radial directions, comprising:

a central opening having a central axis along said axial direction and bounded at its periphery by an innermost layer having at least one punched, innermost winding slot cutout having an innermost cutout width;

an outermost layer radially spaced from said innermost layer and having at least one punched, outermost winding slot cutout having an outermost cutout width; and a main stator body comprising a plurality of intermediate layers between said innermost layer and said outermost layer, each of said plurality of intermediate layers having at least one punched, intermediate winding slot cutout having an intermediate cutout width;

wherein said innermost layer, outermost layer and intermediate layers are formed from a continuous strip of wound material such that said innermost winding slot cutout, said outermost winding slot cutout and said intermediate winding slot cutouts are aligned with one another to form a winding slot;

wherein at least one of said innermost cutout width and said outermost cutout width is larger than said intermediate cutout width, whereby said winding slot approximates a rounded edge at a radial terminal end thereof; and further comprising a plurality of winding wires wound in said winding slot, said winding wires bent around and following said rounded edge of said winding slot.

10. The stator core of claim 9, wherein a plurality of said intermediate layers disposed proximate said outermost layer have widths which progressively increase as said intermediate layers approach said outermost layer.

11. The stator core of claim 9, wherein a plurality of said intermediate layers disposed proximate said innermost layer have widths which progressively increase as said intermediate layers approach said innermost layer.

12. The stator core of claim 9, further comprising at least one welding slot disposed on a side of said stator core axially opposite said winding slot, each said welding slot extending in said radial direction through each of said layers and extending from said innermost layer to said outermost layer.

13. The stator core of claim 9, wherein said winding slots, when viewed axially from a front end of said stator core, have axes extending from said outermost layer to said innermost layer which are perpendicular to said central axis but skewed with respect to said central axis, said winding slot axes not intersecting said central axis.

14. The stator core of claim 9, wherein said winding slots, when viewed axially from a front end of said stator core, have axes extending from said outermost layer to said innermost layer which are perpendicular to said central axis and have an arcuate longitudinal axial profile.

15. The stator core of claim 9, wherein said winding slots, when viewed axially from a front end of said stator core, have axes extending from said outermost layer to said innermost layer which are perpendicular to said central axis and have a double arcuate longitudinal axial profile, in which a curvature of the arcuate profile changes between said innermost layer and said outermost layer.

16. The stator core of claim 9, wherein said winding slots, when viewed axially from a front end of said stator core, have axes extending from said outermost layer to said innermost layer which are perpendicular to said central axis and have a double skewed longitudinal axial profile, in which each winding slot includes two axes disposed at an angle with respect to each other and perpendicular to said central axis, said axes not intersecting said central axis.

17. The stator core of claim 9, wherein said winding slots have transverse axes which are skewed with respect to said central axis.

* * * * *